United States Patent
Barone et al.

(10) Patent No.: US 11,199,256 B2
(45) Date of Patent: Dec. 14, 2021

(54) METHOD TO CONTROL A ROAD VEHICLE FOR THE EXECUTION OF A MULTIPLE DOWNSHIFT IN A DRIVETRAIN PROVIDED WITH A SERVO-ASSISTED TRANSMISSION

(71) Applicant: FERRARI S.p.A., Modena (IT)

(72) Inventors: Alessandro Barone, Bologna (IT);
Andrea Nannini, Modena (IT);
Giacomo Senserini, Modena (IT);
Stefano Marconi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/015,356

(22) Filed: Sep. 9, 2020

(65) Prior Publication Data

US 2021/0095758 A1    Apr. 1, 2021

(30) Foreign Application Priority Data

Sep. 30, 2019    (IT) .................. 102019000017507

(51) Int. Cl.
*F16H 61/02*    (2006.01)
*B60K 23/00*    (2006.01)
(Continued)

(52) U.S. Cl.
CPC ......... *F16H 61/0213* (2013.01); *B60K 23/00* (2013.01); *F16H 59/36* (2013.01);
(Continued)

(58) Field of Classification Search
CPC .......... F16H 59/36; F16H 59/54; F16H 59/70; F16H 2059/366; F16H 2059/0247;
(Continued)

(56) References Cited

U.S. PATENT DOCUMENTS 6,108,600 A * 8/2000 Lehner ................ F16H 61/0403
477/135
6,123,644 A * 9/2000 Janecke .................. F16H 61/10
477/120
(Continued)

FOREIGN PATENT DOCUMENTS

EP    2921746 A1    9/2015
WO    2013153309 A1    10/2013

OTHER PUBLICATIONS

Search Report issued in Italian Patent Application No. 201900017507, date of completion: Mar. 25, 2020; 8 pages.

*Primary Examiner* — Edwin A Young
(74) *Attorney, Agent, or Firm* — Cantor Colburn LLP

(57) ABSTRACT

A method to control a road vehicle for the execution of a multiple downshift in a drivetrain provided with a servo-assisted transmission; the control method comprises the steps of: detecting a condition of slowing down of the road vehicle and, simultaneously, detecting a driver's request for a multiple downshift; carrying out, in succession, a plurality of downshifts while the road vehicle is slowing down and in an autonomous manner regardless of further interventions of the driver; determining a duration of a shift time interval; and carrying out each downshift following a first downshift when said shift time interval has exactly elapsed since the previous downshift.

11 Claims, 3 Drawing Sheets

(51) Int. Cl.
    *F16H 59/36*     (2006.01)
    *F16H 59/54*     (2006.01)
    *F16H 59/70*     (2006.01)

(52) U.S. Cl.
    CPC .............. *F16H 59/54* (2013.01); *F16H 59/70* (2013.01); *B60Y 2300/1882* (2013.01); *F16H 2059/366* (2013.01); *F16H 2061/0216* (2013.01)

(58) Field of Classification Search
    CPC ................. F16H 61/0213; F16H 61/08; F16H 2061/0216; F16H 2061/0223; F16H 2061/0234; F16H 2306/20; B60K 23/00
    See application file for complete search history.

(56) References Cited

U.S. PATENT DOCUMENTS 8,909,445 B2 * 12/2014 Swartling ........... F16H 61/0213
                                                                       701/66
2008/0125946 A1     5/2008  Fakler et al.

\* cited by examiner

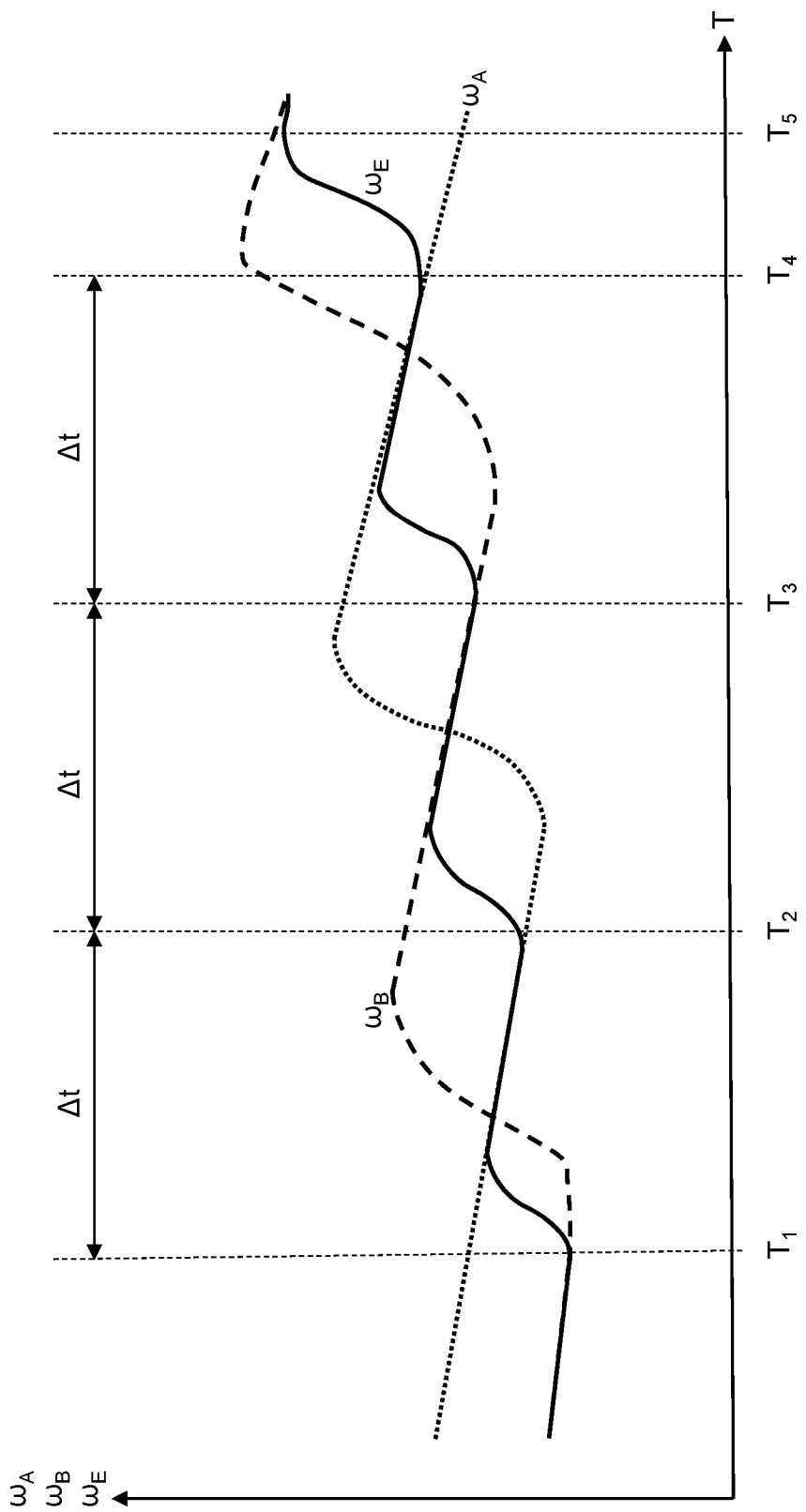

METHOD TO CONTROL A ROAD VEHICLE FOR THE EXECUTION OF A MULTIPLE DOWNSHIFT IN A DRIVETRAIN PROVIDED WITH A SERVO-ASSISTED TRANSMISSION

CROSS-REFERENCE TO RELATED APPLICATIONS

This patent application claims priority from Italian patent application no. 102019000017507 filed on Sep. 30, 2019, the entire disclosure of which is incorporated herein by reference.

TECHNICAL FIELD

The invention relates to a method to control a road vehicle for the execution of a multiple downshift in a drivetrain provided with a servo-assisted transmission.

The invention finds advantageous application in a drivetrain provided with a dual-clutch, servo-assisted transmission, to which explicit reference will be made in the description below without because of this loosing in generality.

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

There is a function (called "sequential downshift") which allows drivers gear down multiple times while braking in order to engage, at the end of the braking, the lowest gear possible (depending on the maximum speed of rotation of the internal combustion engine) so as to have the maximum acceleration possible when starting again (which takes place, indeed, at the end of the braking). This function known as "sequential downshift" is activated by drivers during a braking (namely, when the brake pedal is pressed) by pressing a downshift paddle shifter for a long time (namely, for an amount of time exceeding a predetermined time threshold), said downshift paddle shifter being normally pressed for a short instant in order to request one single downshift (namely, the engagement of a new gear, which is lower than the current gear).

In other words, the driver, in order to control the dual-clutch, servo-assisted transmission, can rely on an upshift paddle shifter, which is briefly pressed in order to request one single upshift (namely, the engagement of a new gear, which is higher than the current gear and contiguous with the current gear), and a downshift paddle shifter, which is briefly pressed in order to request one single downshift (namely, the engagement of a new gear, which is lower than the current gear and is contiguous with the current gear). During a braking (obviously, a prolonged one), drivers, while pressing the brake pedal, can continuously press the downshift paddle shifter in order to activate the function called "sequential downshift", which automatically gears down multiple times while braking so that, at the end of the braking (namely, when the brake pedal is released), the lowest gear possible is engaged.

The function known as "sequential downshift" is typically used when racing on a track, at the end of a straight stretch, when drivers chose to ask this function to handle the selection of the ideal gear while they concentrate on preparing for the next bend.

The function called "sequential downshift" currently entails setting a series of thresholds for the rotation speed of the internal combustion engine and, hence, automatically shifting gear every time the rotation speed of the internal combustion engine reaches a corresponding rotation speed threshold. However, the software generating the series of rotation speed thresholds for the internal combustion engine requires a long and complicated adjustment; furthermore, the operating mode of the function known as "sequential downshift" is usually not appreciated by drivers, who tend to find it "unnatural" (namely, contrary to drivers' expectations), even though effective.

Some examples of implementation of the function called "sequential downshift" are described in patent applications WO2013153309A1 and EP2921746A1.

DESCRIPTION OF THE INVENTION

The object of the invention is to provide a method to control a road vehicle for the execution of a multiple downshift in a drivetrain provided with a servo-assisted transmission, said method not suffering from the drawbacks discussed above and, at the same time, being easy and economic to be implemented.

According to the invention there is provided a method to control a road vehicle for the execution of a multiple downshift in a drivetrain provided with a servo-assisted transmission, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein:

FIG. 3 shows the time development of the rotation speed of the two clutches and of the drive shaft during the execution of a multiple downshift.

PREFERRED EMBODIMENTS OF THE INVENTION

Figure 1:
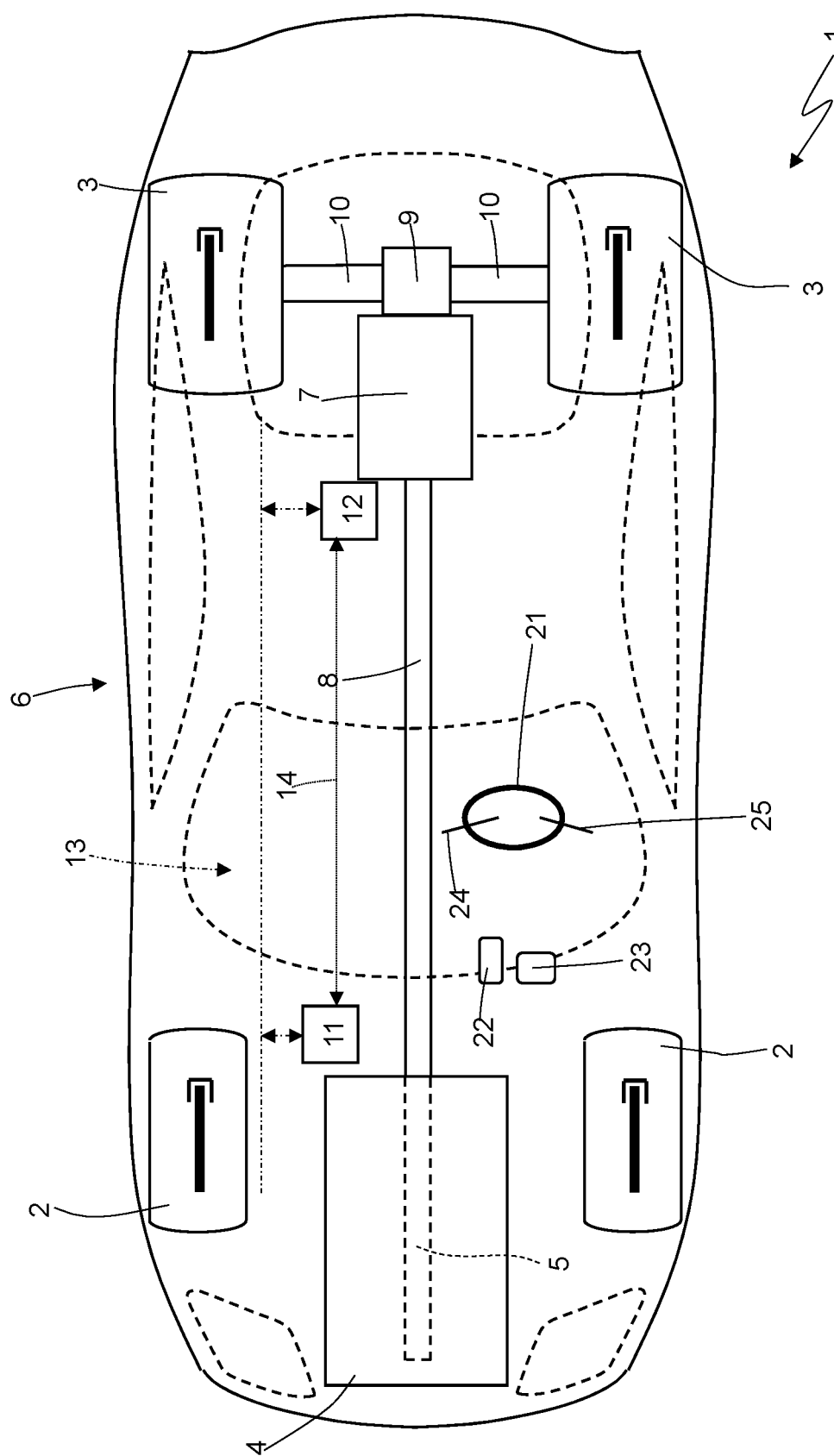
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the engine 4, which controls the engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the engine 4 and the control unit 12 of the drivetrain 6 are connected to the BUS line 13 and, therefore, can communicate with one another by means of messages sent through the BUS line 13. Furthermore, the control unit 11 of the engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the engine 4 without the delays caused by the BUS line 13. Alternatively, the synchronization cable 14 could be absent and all communications between the two control units 11 and 12 could be exchanged using the BUS line 13.

Figure 2:
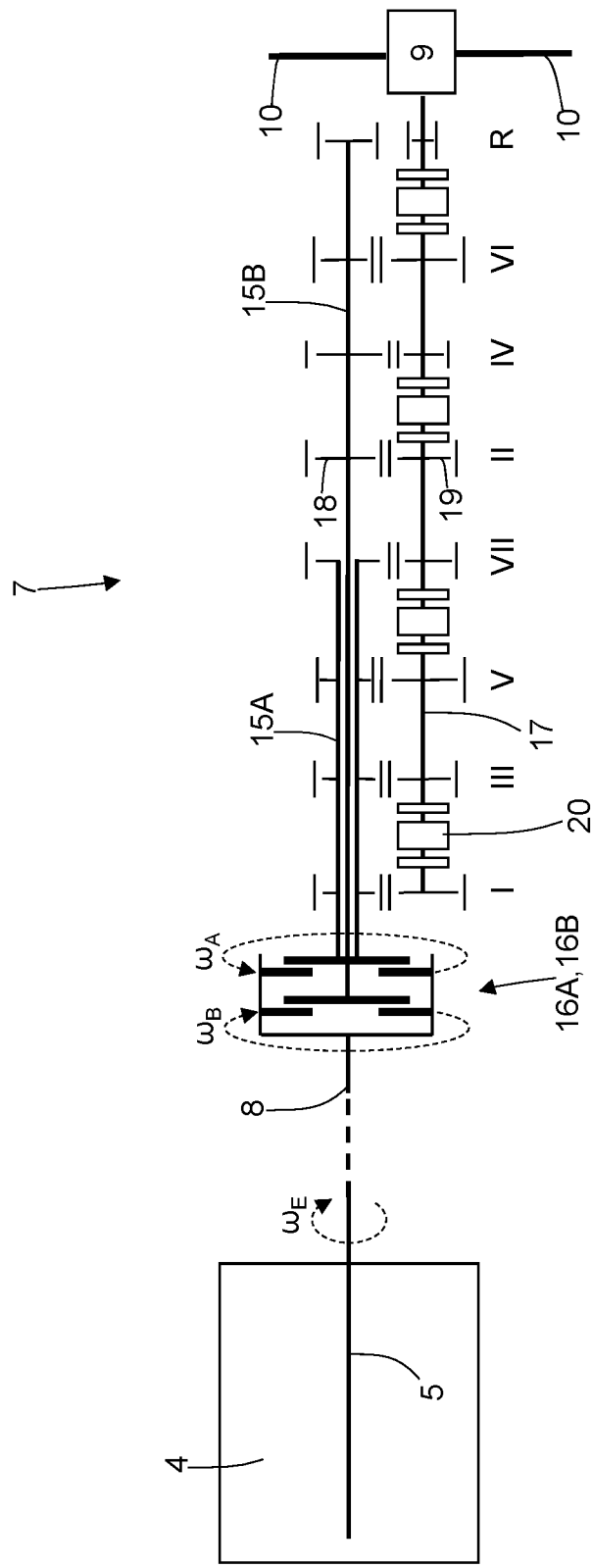
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

When the road vehicle 1 is slowing down (due to the driver acting upon the brake pedal 23) and the driver holds the downshift paddle shifter 25 pressed for a long time (namely, for an amount of time exceeding a predetermined time threshold), said downshift paddle shifter being normally pressed for a short instant in order to request one single downshift, the control unit 12 of the drivetrain 6 activates a function (called "sequential downshift") which allows drivers gear down multiple times while braking in order to engage, at the end of the braking, the lowest gear possible (depending on the maximum speed of rotation of the internal combustion engine 4) so as to have the maximum acceleration possible when starting again (which takes place, indeed, at the end of the braking). This function known as "sequential downshift" determines the automatic execution (namely, with no intervention of the driver), in succession, of a plurality of downshifts up to when the slowing down of the road vehicle 1 is interrupted (namely, up to when the driver stops pressing the brake pedal 23).

In other words, the driver, in order to control the dual-clutch, servo-assisted transmission 7, can rely on an upshift paddle shifter 24, which is briefly pressed in order to request one single upshift (namely, the engagement of a new gear, which is higher than the current gear and contiguous with the current gear), and a downshift paddle shifter 25, which is briefly pressed in order to request one single downshift (namely, the engagement of a new gear, which is lower than the current gear and is contiguous with the current gear). During a braking (obviously, a prolonged one), drivers, while pressing the brake pedal 23, can continuously press the downshift paddle shifter 25 in order to activate the function called "sequential downshift", which automatically gears down multiple times while braking so that, at the end of the braking (namely, when the brake pedal 23 is released), the lowest gear possible is engaged.

The function known as "sequential downshift" is typically used when racing on a track, at the end of a straight stretch, when drivers chose to ask this function to handle the selection of the ideal gear while they concentrate on preparing for the next bend.

The control unit 12 of the drivetrain 6 detects a condition of slowing down of the road vehicle 1 (by determining a degree of pressing of the brake pedal 23, for example by detecting the pressure of the brake fluid in the hydraulic circuit of the braking system) and, simultaneously, detects a driver's request for a multiple downshift (if the driver holds the downshift paddle shifter 25 pressed for a long time); hence, if both conditions discussed above occur, the control unit 12 of the drivetrain 6 carries out, in succession, a plurality of downshifts while the road vehicle 1 is slowing down and in an autonomous manner regardless of further interventions of the driver. In particular, the control unit 12 of the drivetrain 6 determines a duration of one single shift time interval $\Delta t$, which is common to all the plurality of downshifts (namely, said single shift time interval $\Delta t$ applies in the same way to all the downshifts of the plurality of downshifts), and carries out each downshift following a first downshift when said shift time interval $\Delta t$ has exactly elapsed since the previous downshift.

According to a preferred embodiment, the control unit 12 of the drivetrain 6 carries out the first downshift in a same instant $T_1$ (shown in FIG. 3) in which the driver's request for a multiple downshift is detected and carries out all the other downshifts (following the first downshift) each time the shift time interval $\Delta t$ has exactly elapsed since the previous downshift; in this way, all downshifts are equally spaced apart from one another, in terms of time, by the same shift time interval $\Delta t$ (which is always constant, namely always the same). Namely, the duration of the shift time interval $\Delta t$ always remains constant for all the downshifts carried out one after the other.

Obviously, the control unit 12 of the drivetrain 6 determines the plurality of downshifts when the slowing down condition of the road vehicle 1 ceases, namely when the driver releases the brake pedal 23, thus ending the braking.

It should be pointed out that the control unit 12 of the drivetrain 6 delays a downshift in case the latter is likely to cause an excessive increase in the rotation speed COE of the internal combustion engine 4 (i.e. if it is likely cause the rotation speed $\omega_E$ of the internal combustion engine 4 to exceed the maximum speed admitted); namely, if needed, a downshift is delayed until the downshift can be carried out without causing an excessive increase in the rotation speed $\omega_E$ of the internal combustion engine 4.

According to a preferred embodiment, the control unit 12 of the drivetrain 6 determines the duration of the shift time interval $\Delta t$ based on the rotation speed $\omega_E$ of the internal combustion engine 4 in the instant $T_1$ in which the driver's request for a multiple downshift is detected, based on a gear engaged in the dual-clutch, servo-assisted transmission 7 in the instant $T_1$ in which the driver's request for a multiple downshift is detected, and/or based on a degree of pressing of the brake pedal 23 in the instant $T_1$ in which the driver's request for a multiple downshift is detected.

According to a possible embodiment, the control unit 12 of the drivetrain 6 could have, in a memory of its, a map that provides the duration of the shift time interval $\Delta t$ based on the rotation speed $\omega_E$ of the internal combustion engine 4, on the gear engaged in the dual-clutch, servo-assisted transmission 7 and on the degree of pressing of the brake pedal 23.

By way of example, the duration of the shift time interval $\Delta t$ could be of 3-4 tenths of second in case of a high degree of pressing of the brake pedal 23 and of 10-12 tenth of seconds in case of a low degree of pressing of the brake pedal 23.

According to a preferred, though non-binding embodiment, the control unit 12 of the drivetrain 6 determines a value of a comfort index (known as "CMFidx") in the instant $T_1$ in which the driver's request for a multiple downshift is detected and, hence, the control unit 12 of the drivetrain 6 adjusts a speed of execution of the downshifts based on the value of the comfort index; namely, if the comfort index indicates that the driver cares about comfort, the downshifts are carried out more slowly (smoothly) and, hence, trigger smaller longitudinal oscillations, whereas, if the comfort index indicates that the driver does not care about comfort, the downshifts are carried out more quickly (suddenly) and, hence, trigger greater longitudinal oscillations. For example, the control unit 12 of the drivetrain 6 could determine the value of the comfort index based on the position of a selector (also known as "hand lever") controlled by the driver to indicate the type of driving style desired.

FIG. 3 shows an example of a multiple downshift during a (prolonged) braking:

in the instant $T_1$, the driver (who is already pressing the brake pedal 23) presses the downshift paddle shifter 25 and keeps pressing it for a long time; therefore, in the instant $T_1$, the control unit 12 of the drivetrain 6 carries out the first downshift (it should be pointed out that, starting from the instant $T_1$, the rotation speed $\omega_E$ of the internal combustion engine 4 changes from the rotation speed $\omega_B$ of the clutch 16B to the rotation speed $\omega_A$ of the clutch 16A) and calculates the duration of the shift time interval $\Delta t$;

in the instant $T_2$ (which is exactly separated from the instant $T_1$ by the shift time interval $\Delta t$), the control unit 12 of the drivetrain 6 autonomously carries out (namely, without further commands of the driver) the second downshift (it should be pointed out that, starting from the instant $T_2$, the rotation speed $\omega_E$ of the internal combustion engine 4 changes from the rotation speed $\omega_A$ of the clutch 16A to the rotation speed $\omega_B$ of the clutch 16B);

in the instant $T_3$ (which is exactly separated from the instant $T_2$ by the shift time interval $\Delta t$), the control unit 12 of the drivetrain 6 autonomously carries out (namely, without further commands of the driver) the third downshift (it should be pointed out that, starting from the instant $T_3$, the rotation speed $\omega_E$ of the internal combustion engine 4 changes from the rotation speed $\omega_B$ of the clutch 16B to the rotation speed $\omega_A$ of the clutch 16A);

in the instant $T_4$ (which is exactly separated from the instant $T_3$ by the shift time interval $\Delta t$), the control unit 12 of the drivetrain 6 autonomously carries out (namely, without further commands of the driver) the fourth downshift (it should be pointed out that, starting from the instant $T_4$, the rotation speed $\omega_B$ of the internal combustion engine 4 changes from the rotation speed $\omega_A$ of the clutch 16A to the rotation speed $\omega_B$ of the clutch 16B);

in the instant $T_5$ (which is separated from the instant $T_4$ by less than the shift time interval $\Delta t$, hence too soon for a downshift, which, indeed, does not take place), the driver releases the brake pedal 23 (namely, ends the braking phase) and, therefore, the control unit 12 of the drivetrain 6 ends the plurality of downshifts, since the slowing down condition of the road vehicle 1 ceases.

What disclosed above can be applied, with no significant changes, even when the drivetrain 6 of the road vehicle 1 is provided with a single-clutch, servo-assisted transmission.

The embodiments described herein can be combined with one another, without for this reason going beyond the scope of protection of the invention.

The control method described above has different advantages.

First of all, the control method described above allows the adjustment phase to be reduced and simplified to a significant extent, since the law that provides the duration of the shift time interval Δt can be determined and set up in relatively simple and quick manner.

Furthermore, the control method described above controls the dual-clutch, servo-assisted transmission 7 in ways that are generally appreciated by drivers, who deem them to be "natural" (namely, corresponding to the drivers' expectations).

Finally, the control method described above is easy and economic to be implemented as its execution requires a limited memory space and a reduced calculation ability.

LIST OF THE REFERENCE NUMBERS OF THE FIGURES 1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter
25 downshift paddle shifter
$\omega_E$ rotation speed
$\omega_A$ rotation speed
$\omega_B$ rotation speed
$T_1$ time instant
$T_2$ time instant
$T_3$ time instant
$T_4$ time instant
$T_5$ time instant
Δt time interval

The invention claimed is:

1. A method to control a road vehicle (1) for the execution of a multiple downshift in a drivetrain provided with a servo-assisted transmission (7); the control method comprises the steps of:
   detecting a condition of slowing down of the road vehicle (1) and, simultaneously, detecting a driver's request for a multiple downshift;
   carrying out, in succession, a plurality of downshifts while the road vehicle (1) is slowing down and in an autonomous manner regardless of further interventions of the driver;
   determining a duration of a single shift time interval (Δt) common to all the plurality of downshifts; and
   carrying out each downshift following a first downshift when said shift time interval (Δt) has elapsed exactly since the previous downshift.

2. The control method according to claim 1, wherein the first downshift is carried out in a same instant ($T_1$) in which the driver's request for a multiple downshift is detected.

3. The control method according to claim 1, wherein a downshift is delayed if it would cause an excessive increase in a rotation speed ($\omega_e$) of an internal combustion engine (4) connected to the drivetrain (6).

4. The control method according to claim 1, wherein the duration of the shift time interval (Δt) is determined based on a rotation speed ($\omega_e$) of an internal combustion engine (4) in an instant ($T_1$) in which the driver's request for a multiple downshift is detected.

5. The control method according to claim 1, wherein the duration of the shift time interval (Δt) is determined based on a gear engaged in the servo-assisted transmission (7) in an instant ($T_1$) in which the driver's request for a multiple downshift is detected.

6. The control method according to claim 1, wherein the duration of the shift time interval (Δt) is determined based on a degree of pressing of a brake pedal (23) in an instant ($T_1$) in which the driver's request for a multiple downshift is detected.

7. The control method according to claim 1, wherein the duration of the shift time interval (Δt) always remains constant for all downshifts.

8. The control method according to claim 1, wherein the plurality of downshifts ends when the condition of slowing down of the road vehicle (1) ceases.

9. The control method according to claim 1, wherein the condition of slowing down of the road vehicle (1) is detected by determining a degree of pressing of a brake pedal (23).

10. The control method according to claim 1, wherein the driver's request for a multiple downshift is detected if the driver keeps pressing a down paddle shifter (25) for a period of time exceeding a predetermined time threshold.

11. The control method according to claim 1 and comprising the further steps of:
    determining a value of a comfort index in an instant ($T_1$) in which the driver's request for a multiple downshift is detected; and
    adjusting a speed of execution of the downshifts based on the comfort index.

* * * * *